MAGNETIC CORE STRUCTURE AND CIRCUIT

Filed July 28, 1964

INVENTOR
DAVID NITZAN
BY Samuel Lindenberg
ATTORNEY

United States Patent Office 3,341,832

Patented Sept. 12, 1967

3,341,832

MAGNETIC CORE STRUCTURE AND CIRCUIT

David Nitzan, Palo Alto, Calif., assignor to AMP Incorporated, Harrisburg, Pa., a corporation of New Jersey Filed July 28, 1964, Ser. No. 385,742

6 Claims. (Cl. 340—174)

Figure 1:
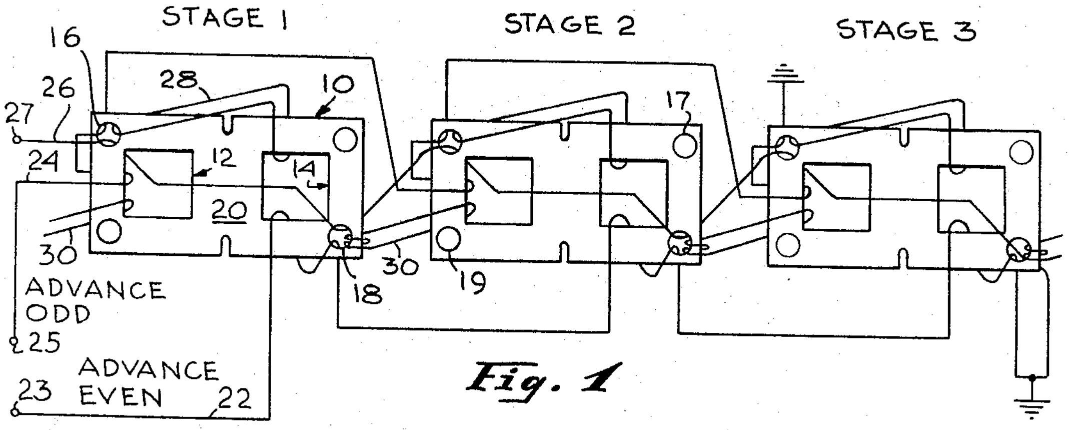

This invention relates generally to improvements in magnetic core structures and circuit arrangements.

Many magnetic core circuit arrangements exist in the prior art which are useful for storing digital information and for performing logical operations. Typical of these circuit arrangements is a magnetic core shift register. In such shift registers having a great number of stages, a problem of cumulative signal or flux attenuation is usually encountered. In view of this problem, it is an object of the present invention to provide means suitable for use in a magnetic core shift register for minimizing changes in signal or flux level between the first and last stages of the register.

In order to compensate for attenuation in some prior art circuit arrangements, means for introducing gain are incorporated in the circuit every certain number of stages. Compensation in this manner is not particularly satisfactory because of the expense involved. Accordingly, it is a further object of the present invention to provide in a magnetic core shift register, a plurality of identically constructed stages each of which has a gain substantially equal to unity for a wide range of drive current.

Various magnetic core shift register configurations are known in the prior art. Generally each configuration includes one stage per bit of storage capacity and each stage includes a pair of storage devices or multiaperture cores. The first core in each stage can be considered as an input core and the second core as an output core. In operation, information is initially stored in the first core while information is being read from the second core. Subsequently, the information stored in the first core is transferred to the second core while the first core is cleared.

Many attempts have been directed toward providing a single, special purpose multiaperture core which can perform the input and output functions of the two multiaperture cores normally used in conventional configurations. As a consequence, a figure "8" core has been developed which is comprised of two core halves. An internal loop couples the first core half to the second core half and an external loop couples the second core half to the first core half of a succeeding stage. The use of a special purpose core, as a figure "8" core, in lieu of two conventional cores helps somewhat to reduce the cost of fabricating a shift register. It is a further object of the present invention however, to provide means for further reducing the costs of providing windings on figure "8" cores.

Briefly, the invention herein is based upon the realization that the cost of a multistage register can be minimized by identically constructing each of the stages and that stages can be satisfactorily identically constructed if the gain of each stage is held close to unity. Inasmuch as the gain of a figure "8" core constitutes the product of the gains of the internal and external coupling loops, the overall core gain can be made substantially equal to unity by a proper choice of turns ratio. As a consequence, the problem of attenuation in a multistage shift register is substantially eliminated without requiring high cost means for introducing gain. In order to further reduce cost, in accordance with an additional aspect of the invention, the loop internally coupling the halves of the figure "8" core can be printed on the core.

Figure 3:
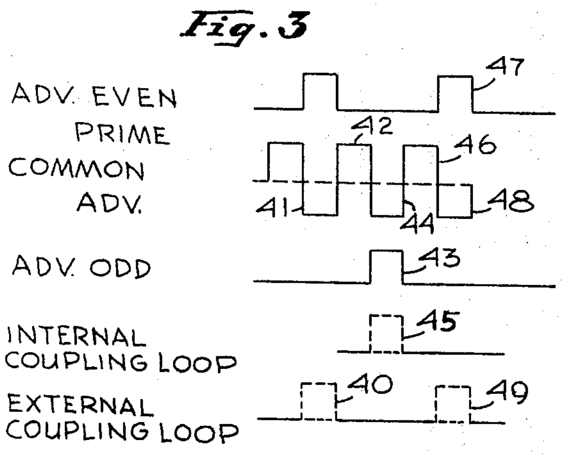
Figures 4A, 4B:
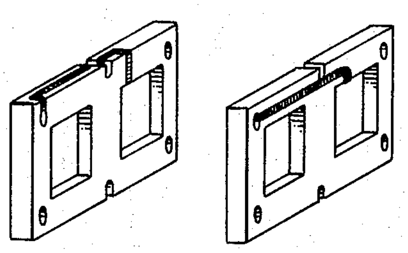

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of a portion of a magnetic core shift register constructed in accordance with the present invention;

FIGURES 2*a* through 2*f* are schematic diagrams of a single figure "8" core respectively illustrating different flux states thereof;

FIGURE 3 is a waveform chart illustrating various signals applied to and derived from the shift register of FIGURE 1; and FIGURES 4*a* and 4*b* are perspective views of alternative arrangements of a multiaperture magnetic core constructed in accordance with the present invention.

Attention is now called to FIGURE 1 of the drawings which illustrates a portion of a shift register constructed in accordance with the present invention. Three stages of the shift register are illustrated, each stage being comprised of a magnetic core 10 of the figure "8" type. The core 10 includes first and second halves respectively defining major apertures 12 and 14. In addition, the first and second core halves respectively define minor transmitting apertures 16 and 18. Each core usually defines an additional pair of minor apertures 17 and 19 which are sometimes used to nondestructively read the core but which will not be considered herein.

The core 10 can be assumed to be formed of a ferromagnetic material of uniform thickness. The relative dimensions of the core can be substantially as illustrated. That is, the cross-sectional area of the leg 20 defined between the major apertures 12 and 14 can be considered as being of four units with the cross-sectional area in each of the other legs adjacent the apertures 12 and 14 being of two units.

Digital information can be selectively stored in either half of the core 10. The first half of the core 10 including the apertures 12 and 16 can be considered as the input section and the second core half including the apertures 14 and 18 can be considered as the output section. As will be clearly seen hereinafter, digital information can be initially stored in the first core half. Subsequently, the information stored in the first core half can be transferred to the second core half while the first core half is cleared. Subsequently, the information stored in the second core half can be transferred to the first core half of a succeeding register stage while the second core half is cleared.

Three windings respectively identified by the numerals 22, 24, and 26 are similarly coupled to each stage of the shift register. Winding 22, having an input terminal 23, is an ADVANCE EVEN winding which threads both the apertures 14 and 18 in each of the cores 10. Winding 24, having an input terminal 25, is an ADVANCE ODD which similarly threads the apertures 12 and 16 in each of the cores. Winding 26, having an input terminal 27, will be referred to as a COMMON winding and threads the apertures 16 and 18 of each core. In addition to the windings 22, 24, and 26 which are coupled to all of the cores in the shift register, a different internal coupling loop 28 and external coupling loop 30 is associated with each core. Thus, each coupling loop 28 threads the apertures 16 and 14 of a different core thereby coupling the first core half to the second core half. The external coupling loop 30 threads the aperture 18 of a core and the aperture 12 of a succeeding core.

It should be noted and is specifically pointed out that the internal coupling loop 28 has a 1:1 turns ratio; i.e.

the same number of turns thread aperture 16 as aperture 14. On the other hand, the external coupling loop 30 has a 2:1 turns ratio; i.e. twice as many turns thread aperture 18 as aperture 12 in the succeeding core.

Figures 2A, 2B, 2C, 2D, 2E, 2F:
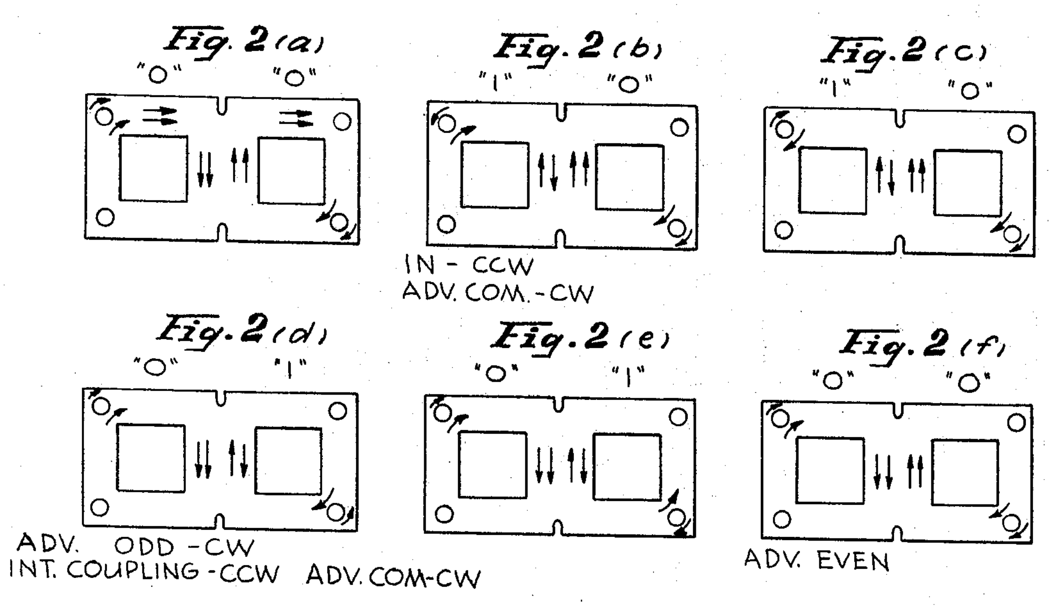

In order to understand the operation of the shift register of FIGURE 1, attention is called to FIGURES 2 and 3 which respectively illustrate different flux states which each core 10 can assume and signals which are applied to and derived from the windings coupled to the cores of FIGURE 1 for storing and shifting information through the register. Consider first the flux pattern of the core illustrated in FIGURE 2*a*. It will be noted that the lines of flux in the closed flux loop around apertures 12 and 14 both extend in a clockwise direction. Let this state be defined as a binary "0" state. In order to store a binary "1" in the first half of the core 10, the flux therein can be switched to the orientation illustrated in FIGURE 2*b*. This flux orientation can be established by applying or inducing a signal 40 in the external coupling loop 30 which tends to orient all the flux around the aperture 12 in a counterclockwise direction while simultaneously applying a negative signal 41 to the terminal 27 which develops a current in the winding 26 tending to orient the flux around the aperture 16 in a counterclockwise direction. As a consequence of the cumulative effect of the currents through windings 26 and 30, the flux around the aperture 12 will, upon the termination of these currents, be oriented as is illustrated in the first half of the core shown in FIGURE 2*b*. By subsequently applying a positive priming pulse 42 to the common winding 26, the flux orientation around the aperture 16 can be switched to a clockwise direction without affecting the flux orientation around the rest of the aperture 12. As a result of the positive priming pulse on winding 26, a resulting flux orientation as shown in FIGURE 2*c* will be established.

Thus far, it has been shown how a binary "1" can be written into the first half of a core 10 and how the first half of the core can then be switched to a prime state. In order to transfer the information stored in the first half of the core 10 to the second half of the core 10, a positive pulse 42 can be subsequently applied to the terminal 25 to establish a current in the winding 24 tending to orient the flux around the aperture 12 in a clockwise direction. Simultaneous with the application of the positive pulse to the winding 24, a negative pulse 44 is applied to the terminal 27 of winding 26. The cumulative effect of the resulting current through winding 26 and the current through the portion of winding 24 threaded through aperture 16 tends to orient the flux around the aperture 16 in a direction consistent with a clockwise direction around the aperture 12 rather than in a circular direction around the aperture 16. As a consequence, flux switching occurs around aperture 16 thereby inducing a signal 45 in the internal coupling loop 28 which is threaded through aperture 14. The internal coupling loop signal tends to orient the flux in a clockwise direction around aperture 14. The current through the common winding 26 tends to orient the flux in a counterclockwise direction around aperture 18 so that at the termination of the pulses applied to the windings 24 and 26, the flux will be oriented in the core 10 as shown in FIGURE 2*d*. That is, a binary "0" will be stored in the first half of the core and a binary "1" will be stored in the second half of the core. A positive pulse 46 subsequently applied to the common winding 26 will switch the flux orientation around aperture 18 to thereby define a prime state as shown in FIGURE 2*e*.

Subsequently, a positive pulse 47 is applied to the winding 22 simultaneous with the application of a negative pulse 48 to the common winding 26. The current in the portion of the winding 22 threaded through the aperture 14 will tend to orient the flux around the aperture 14 in a clockwise direction. The cumulative effect of the current in the portions of the windings 22 and 26 threaded through the aperture 18 is to destroy the circular field therearound and to aid in establishing the clockwise field around aperture 14. The resulting flux switching around aperture 18 will thus induce a pulse 49 in the external coupling loop 30 which will be coupled to the first half of the core of a succeeding stage to switch it to its binary "1" state in the aforedescribed manner.

It should be pointed out that by limiting the magnitude of the positive priming pulse, assurance is had that it will only affect core halves defining a binary "1" state inasmuch as it will only act to reverse the circular field around a transmitting aperture and will be insufficient to switch any flux around the major apertures. Thus, the positive priming pulse has no affect on core halves storing a binary "0." It should also be noted that although flux switching occurs around the apertures 16 and 18 in response to the application of the positive priming pulse to the terminal 27, these induced pulses will have no affect on the core halves to which they are coupled inasmuch as they act in the direction of further saturation.

By utilizing the internal coupling loop 28 having a 1:1 turns ratio, a flux gain G, equal to about .8 is established between the halves of the core 10. By utilizing a 2:1 turns ratio for the external coupling loop 30, a flux gain $G_2$ of approximately 1.2 is established between adjacent cores. Inasmuch as the total gain per stage is equal to the product $(G_1G_2)$ of the gains for each of the coupling loops, each stage of the register is characterized by having a gain substantially equal to unity. It is significant that a gain of unity for each and every stage of the register and of course for the entire register can be achieved without resorting to the introduction of flux gain means between appropriate stages. More particularly, all of the stages of a register constructed in accordance with the present invention can be identically wound thereby minimizing fabrication costs.

In order to further reduce the costs involved in constructing a shift register of the type illustrated in FIGURE 1, the internal coupling loop 28 can be printed on the core as illustrated in FIGURES 4*a* and 4*b*. Thus, FIGURE 4*a* illustrates how a conductor 50 can be deposited on the edge of each of the cores and be threaded through the apertures 14 and 16. FIGURE 4*b* shows how a conductor 52 can be deposited on opposite faces of the core to again couple the apertures 14 and 16. Appropriate techniques for depositing conductive material on magnetic material are known in the prior art. The determination as to whether the conductors should be deposited as shown in FIGURE 4*a* or FIGURE 4*b* depends principally upon the intended application and packaging of the cores. Inasmuch as only the internal coupling loop 28 on the cores shown in FIGURE 1 lies totally within a single core, conductor deposition cannot be used to fully implement any of the other windings. It should be appreciated however that portions of the other windings could be deposited on the cores with copper wire being used for the portions of the windings external to the cores. The copper wire of course can be soldered to the deposited conductors.

From the foregoing, it should be appreciated that magnetic core winding techniques have been disclosed herein which enable a magnetic core shift register to be provided at a considerably reduced cost inasmuch as a multistage register having an overall gain substantially equal to unity can be provided utilizing a plurality of identical stages. This is achieved by assuring a gain of unity in each stage by compensating for the attenuation in the internal coupling loop with gain in the external coupling loop. Further fabrication cost reduction is achieved by depositing conductors on the magnetic cores rather than by treating copper wires through the core apertures as is conventional practice. Although particular attention has been directed herein to the use of figure "8" multiaperture cores, it should be appreciated that shift registers using two conventional multiaperture cores per stage could also profitably utilize the winding arrangement disclosed herein for providing stages having a gain of unity.

What is claimed is:

1. In a magnetic core circuit arrangement including a plurality of stages, each stage comprised of a magnetic core input section and a magnetic core output section;

an internal loop coupling the input section of each stage to the output section of the same stage;

an external loop coupling the output section of each stage to the input section of a succeeding stage;

said internal and external loops having winding ratios respectively defining gains $G_1$ and $G_2$ where the product $G_1G_2$ is substantially equal to unity.

2. In a magnetic core shift register including a plurality of identical stages, each stage comprised of a figure "8" magnetic core having first and second core halves;

an internal loop coupling the first half of each of said cores to the second half of the same core;

an external loop coupling the second half of each of said cores to the first half of a succeeding core;

said internal and external loops having winding ratios respectively defining gains $G_1$ and $G_2$ where the product $G_1G_2$ is substantially equal to unity.

3. The shift register of claim 2 wherein said internal loop has a 1:1 turns ratio and said external loop has a 2:1 turns ratio.

4. The shift register of claim 3 wherein said internal loop is formed by conductive material deposited on the surface of said core and said external loop is formed by a conductive wire threaded through said core.

5. The shift register of claim 2 wherein said internal loop is formed by conductive material deposited on the surface of said core.

6. In combination with an external device and a magnetic core in the shape of a figure "8" thereby defining first and second core halves;

a path of conductive material deposited on the surface of said core coupling said first and second core halves and having a 1:1 turns ratio; and a conductive loop coupling said second core to said external device and having a 2:1 turns ratio.

References Cited

UNITED STATES PATENTS 3,196,117 7/1965 Engelbart ------------ 340—174
3,206,733 9/1965 Briggs -------------- 340—174

BERNARD KONICK, *Primary Examiner.*

P. SPERBER, *Assistant Examiner.*